(12) United States Patent
Sakai et al.

(10) Patent No.: US 10,857,903 B2
(45) Date of Patent: Dec. 8, 2020

(54) POWER CONTROL SYSTEM FOR ELECTRIC VEHICLE

(71) Applicant: DENSO CORPORATION, Kariya (JP)

(72) Inventors: Koji Sakai, Kariya (JP); Tomoyuki Sumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 505 days.

(21) Appl. No.: 15/570,500

(22) PCT Filed: Mar. 29, 2016

(86) PCT No.: PCT/JP2016/001817
§ 371 (c)(1),
(2) Date: Oct. 30, 2017

(87) PCT Pub. No.: WO2016/189787
PCT Pub. Date: Dec. 1, 2016

(65) Prior Publication Data
US 2018/0141438 A1   May 24, 2018

(30) Foreign Application Priority Data

May 22, 2015  (JP) ................................. 2015-104194

(51) Int. Cl.
*B60L 1/00* (2006.01)
*B60L 1/02* (2006.01)
(Continued)

(52) U.S. Cl.
CPC ................. *B60L 58/12* (2019.02); *B60L 1/00* (2013.01); *B60L 1/003* (2013.01); *B60L 1/02* (2013.01);
(Continued)

(58) Field of Classification Search
CPC .. B60L 1/00; B60L 58/12; B60L 1/003; B60L 1/08; B60L 1/02; H02J 13/0003; H02J 1/08; H02J 1/14; H02P 27/06
See application file for complete search history.

(56) References Cited

U.S. PATENT DOCUMENTS

| 2002/0014869 A1* | 2/2002 | Omata .................... B60L 58/10 |
| | | 318/139 |
| 2002/0113576 A1* | 8/2002 | Oomura ................ H02J 7/0032 |
| | | 320/134 |

(Continued)

FOREIGN PATENT DOCUMENTS

| JP | 2003186545 A | 7/2003 |
| JP | 2006288024 A | 10/2006 |

(Continued)

OTHER PUBLICATIONS

Atsushi, JP2013103554_Description, 2013, EPO Machine Translation (Year: 2013).*

Primary Examiner — Genna M Mott
Assistant Examiner — Majdi Alsomiri
(74) Attorney, Agent, or Firm — Harness, Dickey & Pierce, P.L.C.

(57) ABSTRACT

A power control system supplies electric power to a plurality of power consumption devices which are provided to an electric vehicle. This system includes: a high voltage battery which is an electric power supply source; a plurality of device controllers which are provided to the respective power consumption devices and which control operations of the respective power consumption devices; and an overall controller which overall controls the plurality of device controllers. At least one of the device controllers performs an electric power restriction that restricts a consumed electric power in a corresponding power consumption device so as to allow the consumed electric power in the correspond- (Continued)

ing power consumption device to fall within an electric power allocated by the overall controller while simultaneously maintaining an operation of the corresponding power consumption device stably.

22 Claims, 15 Drawing Sheets

(51) Int. Cl.
*B60L 58/12* (2019.01)
*H02J 1/08* (2006.01)
*H02J 1/14* (2006.01)
*H02J 13/00* (2006.01)
*B60L 1/08* (2006.01)
*H02P 27/06* (2006.01)

(52) U.S. Cl.
CPC ...... *B60L 1/08* (2013.01); *H02J 1/08* (2013.01); *H02J 1/14* (2013.01); *H02J 13/0003* (2013.01); *H02P 27/06* (2013.01)

(56) References Cited

U.S. PATENT DOCUMENTS

| | | | |
|---|---|---|---|
| 2003/0128002 A1 | 7/2003 | Kokubo et al. | |
| 2004/0168449 A1* | 9/2004 | Homan | B60H 1/004 62/134 |
| 2007/0114954 A1* | 5/2007 | Hampo | B60L 15/007 318/105 |
| 2009/0067202 A1* | 3/2009 | Ichikawa | B60L 15/2045 363/79 |
| 2010/0019728 A1* | 1/2010 | Ichikawa | B60L 1/003 320/134 |
| 2011/0213524 A1* | 9/2011 | Matsumoto | B60L 58/25 701/22 |

FOREIGN PATENT DOCUMENTS

| | | | |
|---|---|---|---|
| JP | 2013070541 A | 4/2013 | |
| JP | 2013103554 A | 5/2013 | |
| JP | 2013216245 A | 10/2013 | |
| JP | 2014236561 A | 12/2014 | |

* cited by examiner

POWER CONTROL SYSTEM FOR ELECTRIC VEHICLE

CROSS REFERENCE TO RELATED APPLICATIONS

This application is a U.S. National Phase Application under 35 U.S.C. 371 of International Application No. PCT/JP2016/001817 filed on Mar. 29, 2016 and published in Japanese as WO 2016/189787 A1 on Dec. 1, 2016. This application is based on and claims the benefit of priority from Japanese Patent Application No. 2015-104194 filed on May 22, 2015. The entire disclosures of all of the above applications are incorporated herein by reference.

TECHNICAL FIELD

The present disclosure relates to a power control system that performs electric power supply to a plurality of power consumption devices installed in an electric vehicle.

BACKGROUND ART

There is recently becoming popular an electric vehicle that runs with an electric power stored in a high voltage battery. The electric vehicle drives a dynamo-electric machine with the electric power stored in the high voltage battery, and runs with the driving force of the dynamo-electric machine. This electric vehicle includes a vehicle that runs only with the driving force of the dynamo-electric machine and a vehicle that runs with both the driving force of the dynamo-electric machine and the driving force of the internal-combustion engine, i.e., so-called hybrid vehicle.

The electric vehicle is equipped with several devices (hereinafter, collectively referred to as "power consumption devices") operated on the electric power from the high voltage battery in addition to the above dynamo-electric machine. The power consumption devices include a DC-DC converter that performs electric power conversion, and an electrically-driven compressor as a part of an air-conditioner system.

The high voltage battery is able to output a comparatively large electric power. Suppose, however, a sudden acceleration of the vehicle occurring and increasing temporarily the electric power consumption in the dynamo-electric machine. Such a case may cause the high voltage battery to fail to output the electric power to meet with a request from all other power consumption devices. This case controls to restrict the electric power consumed in some power consumption devices and thus provide the electric power preferentially to the other devices (such as the dynamo-electric machine).

For example, Patent literature 1 recites an electrically-driven compressor control system in which a compressor electronic unit controlling an electrically-driven compressor suppresses the number of rotations of the electrically-driven compressor based on the upper limit of the electric power that is transmitted from a high order electronic unit, thereby restricting the electric power consumed in the electrically-driven compressor.

PRIOR ART LITERATURES

Patent Literature

Patent literature 1: JP 2013-070541 A

SUMMARY OF INVENTION

Such restriction of the consumed electric power may cause the state of the power consumption device to be unstable, possibly stopping its operation. In addition, this may cause the whole system including the power consumption device to become under an unstable state, or to stop.

Suppose the restriction of the consumed electric power having been rapidly performed for a short time in the electrically-driven compressor of the air-conditioning system. Such a case pulsates significantly the refrigerant which passes the electrically-driven compressor or reduces the pressure of the refrigerant rapidly, thereby possibly posing the whole air-conditioning system to be unstable and posing the air temperature in the vehicle compartment to become unpleasant. This results in requiring the restart of the air-conditioning system.

It is an object of the present disclosure to provide a power control system capable of performing appropriately a restriction of electric power consumed in at least one of power consumption devices while simultaneously maintaining an operation of the one of the power consumption devices stable and allocating appropriately the electric power to a plurality of power consumption devices.

To achieve the above object, according to an aspect of the present disclosure, a power control system supplying electric power to a plurality of power consumption devices in an electric vehicle is provided as follows. The power control system includes: a high voltage battery that is an electric power supply source; a plurality of device controllers that are provided to the respective power consumption devices to control operations of the respective power consumption devices; and an overall controller that overall controls the plurality of device controllers. Herein, at least one device controller among the device controllers performs an electric power restriction that restricts a consumed electric power in a corresponding power consumption device so as to allow the consumed electric power in the corresponding power consumption device to fall within an electric power range allocated by the overall controller while simultaneously maintaining an operation of the corresponding power consumption device stably.

Such a power control system provides a device controller that performs the electric power restriction restricting the electric power consumed in a corresponding power consumption device so as to fall within an electric power range allocated by an overall controller. Such a configuration suppresses a consumed electric power in an appropriate mode (such as reducing the consumed electric power in a step-by-step manner), the mode which performs the electric power restriction not only by simply according with an instruction from the overall controller but also by maintaining an operation of the power consumption device stable.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
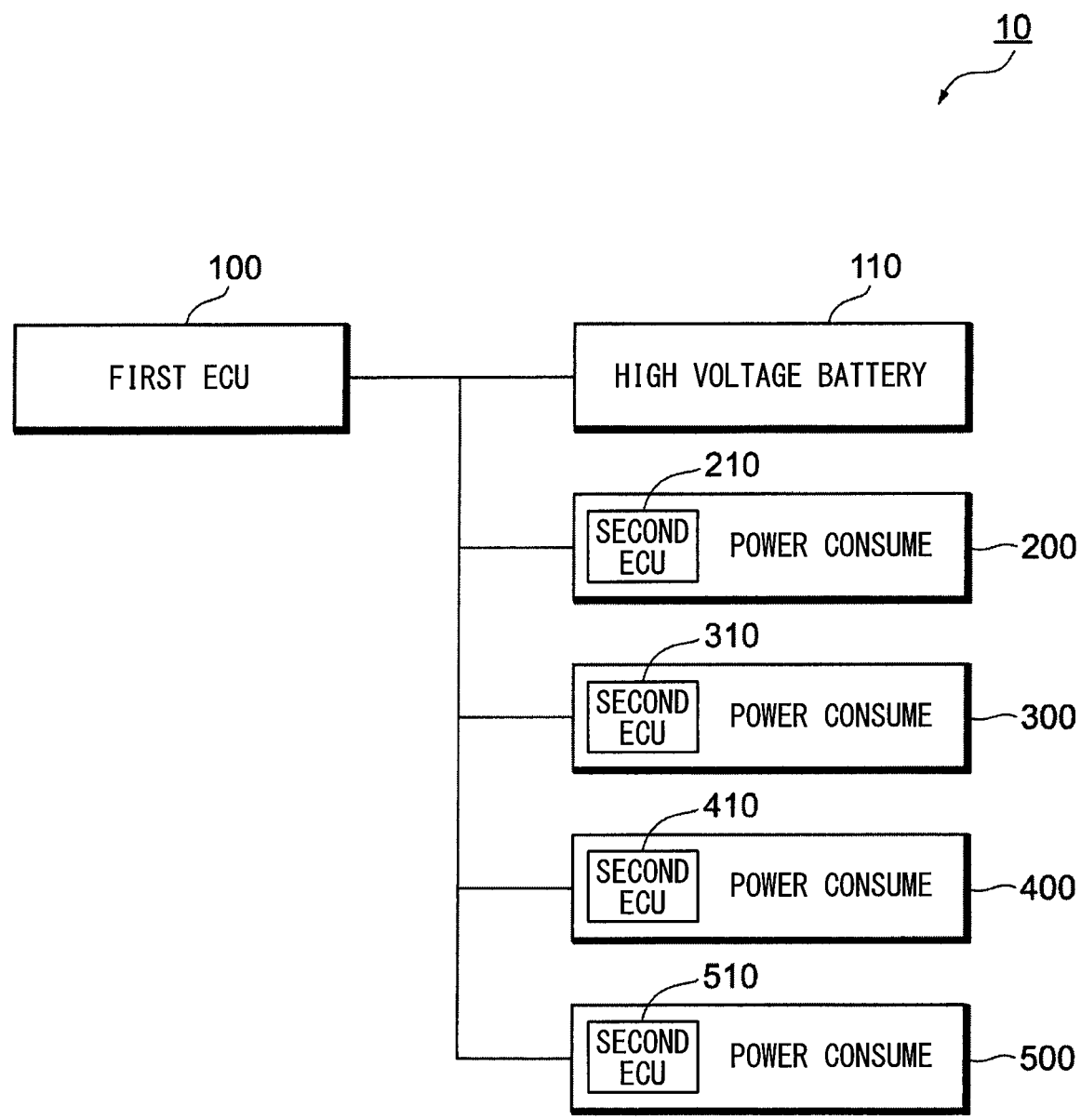
FIG. 1 is a diagram illustrating a schematic configuration of a power control system according to a first embodiment of the present disclosure.

The following will explain embodiments of the present disclosure with reference to drawings. In order to easily understand the explanation, identical components are assigned with respective identical reference numerals in the respective drawings; the duplicated explanation is thus omitted.

First Embodiment

Figure 2:
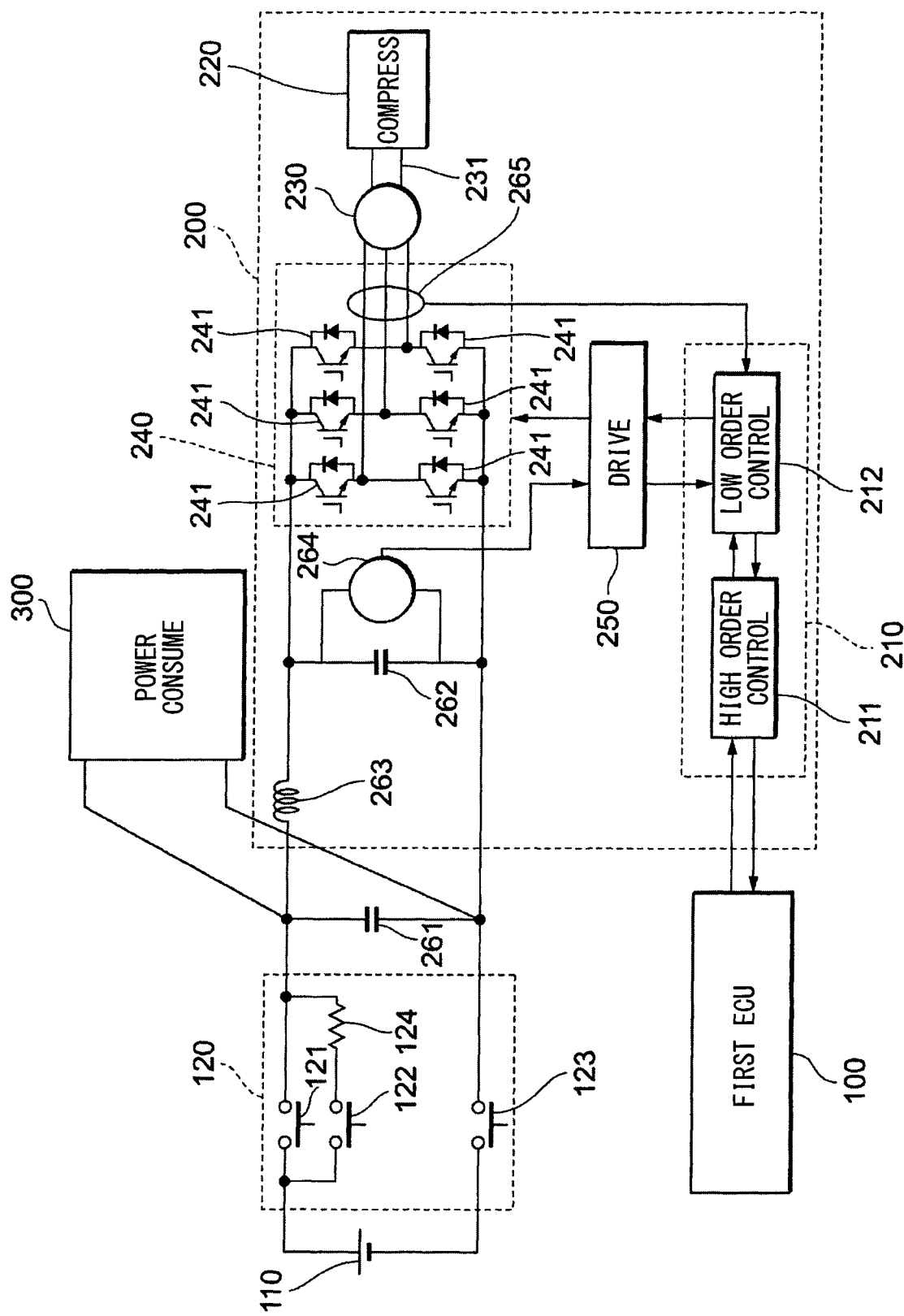
FIG. 2 is a diagram illustrating an internal configuration of one of power consumption devices in the power control system as in FIG. 1.
Figure 3:
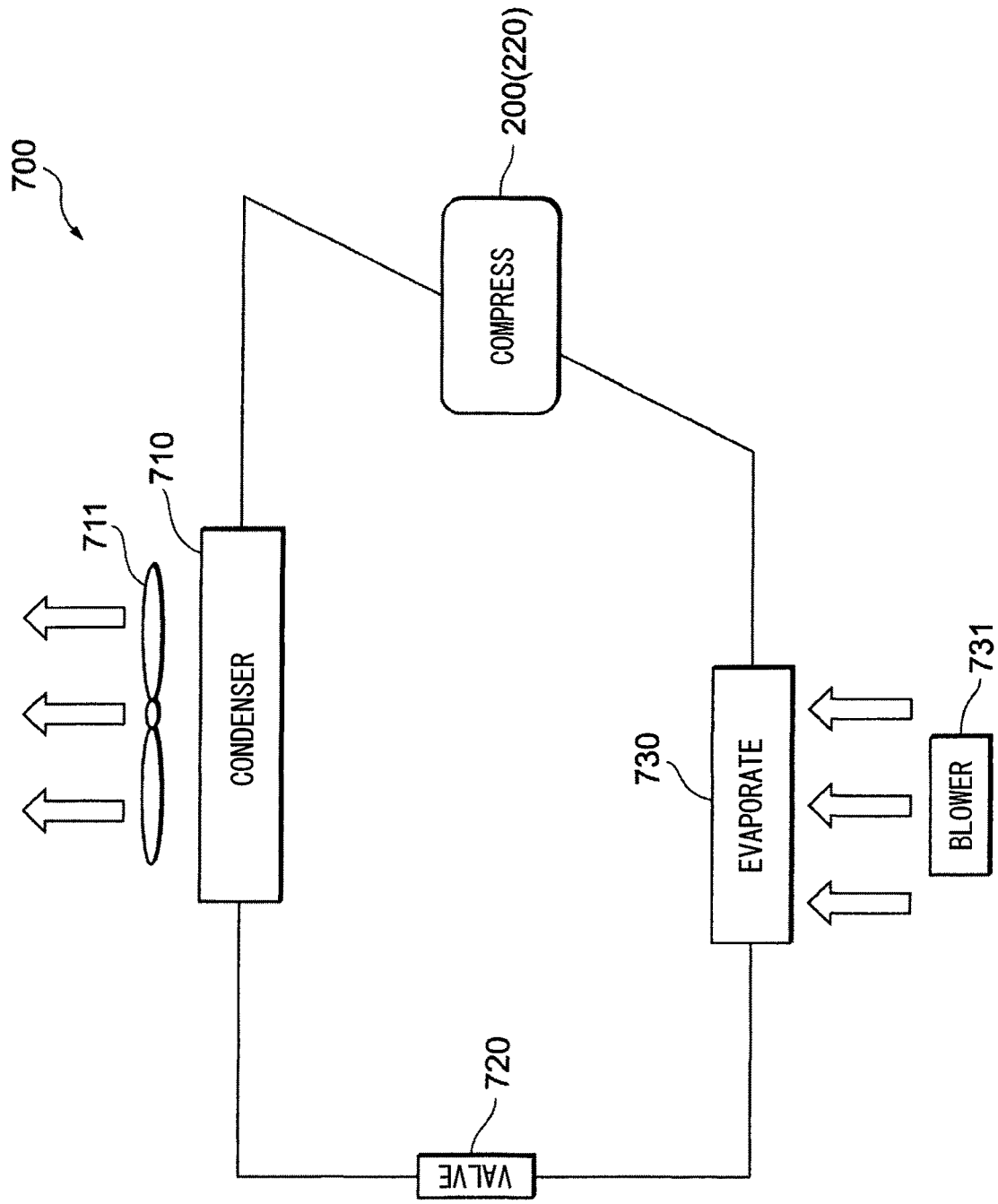
FIG. 3 is a diagram illustrating a schematic configuration of an air-conditioning system.

The following will explain a configuration of a power control system 10 according to a first embodiment of the present disclosure with reference to FIGS. 1 to 3. The power control system 10 is configured to perform the electric power supply to each of a plurality of power consumption devices 200, 300, 400, and 500 installed in a vehicle (unshown).

As schematically illustrated in FIG. 1, the electric vehicle is mounted with a first ECU 100, a high voltage battery 110, and four power consumption devices 200, 300, 400, and 500.

The high voltage battery 110 is a storage battery for providing the electric power to a dynamo-electric machine (unshown) included in the electric vehicle. In addition, the high voltage battery 110 provides also the electric power for operation to each of the power consumption devices 200, 300, 400, and 500. The maximum of the electric power, i.e., the allocation of the available electric power (represented as "electric power allocation," hereinafter), which is provided to each of the devices, is determined by the first ECU 100.

The power consumption devices 200, 300, 400, and 500 each are a device which operates upon receiving the supply of the electric power from the high voltage battery 110. For example, the power consumption device 200 is configured to be an electrically-driven compressor that is included as a part of an air-conditioning system 700 (FIG. 3).

The power consumption devices 200, 300, 400, and 500 (represented as "power consumption devices 200 etc.", hereinafter) are mounted with and controlled by respective second ECUs 210, 310, 410, and 510 (represented as "second ECUs 210 etc.", hereinafter). The second ECUs 210 etc. communicate with the first ECU 100 and control operations of the respective power consumption devices 200 etc. In addition, the second ECUs 210 etc. each perform a process that suppresses the consumed electric power (electric power restriction process, also represented as "electric power restriction", hereinafter) so as to control the consumed electric power in each of the corresponding power consumption devices 200 etc. not to exceed the electric power allocation. The second ECUs 210 etc. may be also each referred to as a device controller.

The first ECU 100 is configured to be a controller which manages the whole of the power control system 10. The first ECU 100 communicates with the respective second ECUs 210, 310, 410, and 510 and performs an overall control for the respective second ECUs 210, 310, 410, and 510. The detailed control will be explained later. The first ECU 100 may be also referred to as an overall controller.

Note that the first ECU 100 may be configured to be a unit as a separate body separated from each of the high voltage battery 110 and the power consumption devices 200, 300, 400, and 500 as in FIG. 1, or as an integrated single body integrated with the high voltage battery 110 etc. In addition, the first ECU 100 may also be configured to be a unit that controls the whole of the electric vehicle, in addition to controlling the power control system 10.

The detailed configuration of the power consumption device 200 is explained referring to FIG. 2. Note that the configurations of the respective power consumption devices 300, 400, and 500 may be equivalent to that of the power consumption device 200. The explanation thereof is thus omitted.

The power consumption device 200 includes: a compression part 220 as an electrically-driven compressor; an electric motor 230, a power conversion part 240, and a driver 250, in addition to the already-described second ECU 210. Further, the second ECU 210 includes a high order control unit 211 and a low order control unit 212.

The compression part 220 functions as a pump for compressing and circulating the refrigerant in the air-conditioning system 700 (FIG. 3). The compression part 220 is driven by the electric motor 230 explained below.

The electric motor 230 is a dynamo-electric machine which operates upon receiving the supply of the AC (Alternate-Current) power which has three phases of U phase, V phase, and W phase. The electric motor 230 has an output axis 231 connected to the compression part 220. When three-phase AC power is provided to the electric motor 230, the driving force of the electric motor 230 is transmitted to the compression part 220 via the output axis 231, driving the compression part 220.

The power conversion part 240 is configured to be a three-phase full bridge inverter circuit, which converts the DC (Direct-Current) power from the high voltage battery 110 into the AC power and supplies it to the electric motor 230. The power conversion part 240 is provided with six switching elements 241 each having an IGBT and a reflux diode; thus the six switching elements 241 thereby include three upper arms and three lower arms. The duty due to the switching operation of the six switching elements 241 adjusts the magnitude of the three-phase AC power supplied to the electric motor 230.

The driver 250 controls an operation of the power conversion part 240. The driver 250 makes the switching element 241 perform a switching operation based on a control signal from the second ECU 210, and adjusts the magnitude of the three-phase AC power provided to the electric motor 230. In addition, the driver 250 transmits a signal of excessive voltage to the power conversion part 240, performing a process stopping an operation of the power conversion part 240.

In between the high voltage battery 110 and the power conversion part 240, a relay system 120 is provided. The relay system 120 has three relays 121, 122, and 123 and a protective resistance 124. The opening and closing operation by the relays 121, 122, and 123 switches the supply and shutdown of the electric power between the high voltage battery 110 and the power conversion part 240.

When the supply of the electric power is started from the high voltage battery 110, the relay 122 and the relay 123 each are first made into the closed state while the relay 121 remains in the opened state. This allows the electric power from the high voltage battery 110 to pass through the protective resistance 124, suppressing an occurrence of the excessive inrush current accompanying the application of the high voltage. Then, the relay 121 is made into the closed state whereas the relay 122 is made into the opened state. The opening-closing switching operation by the relays 121, 122, and 123 is controlled by the first ECU 100. When a certain anomaly arises in the power control system 10, the relays 121, 122, and 123 are made into the opened state, shutting down the supply of the electric power from the high voltage battery 110.

In between the relay system 120 and the power conversion part 240, a smoothing circuit is provided which includes capacitors 261 and 262 and a coil 263. The smoothing circuit is to smooth the DC power inputted into the power conversion part 240.

Adjacent to the capacitor 261, a voltmeter 264 is provided. The voltmeter 264 measures the voltage applied to both ends of the capacitor 261, i.e., the voltage of the DC power inputted into the power conversion part 240. The voltage value measured by the voltmeter 264 is inputted into the driver 250, and inputted also into the second ECU 210 via the driver 250.

At the output part of the power conversion part 240, i.e., in between the power conversion part 240 and the electric motor 230, an ammeter 265 is provided. The ammeter 265 measures the current value of the three-phase AC power provided to the electric motor 230 from the power conversion part 240. The current value measured by the ammeter 265 is inputted into the second ECU 210.

The power consumption devices 300, 400, and 500 other than the power consumption device 200 are connected to the high voltage battery 110 so as to be mutually parallel, like the power consumption device 200. FIG. 2 illustrates only the power consumption device 300; however, other power consumption devices 400 and 500 are also connected to be parallel.

The high order control unit 211 and the low order control unit 212 are configured as two different microcomputers that can perform arithmetic processing with respective operation periods that are different from each other. The high order control unit 211 functions as an interface communicating with the first ECU 100. In addition, the high order control unit 211 transmits a control signal to the low order control unit 212, thereby indirectly performing a control for the driver 250 (which may be defined as a control for the electric motor 230 or the compression part 220).

The high order control unit 211 controls the communication with the first ECU 100, or controls the whole of the power consumption device 200; the process by the high order control unit 211 is repeatedly performed with a comparatively long operation period.

The low order control unit 212 controls the driver 250 based on the control signal transmitted from the high order control unit 211; the process by the low order control unit 212 is repeatedly performed with a comparatively short operation period.

The configuration of the air-conditioning system 700 is explained referring to FIG. 3. The air-conditioning system 700 is configured to be a so-called refrigerating circuit, which includes a condenser 710, an expansion valve 720, and an evaporator 730, in addition to the power consumption device 200 as an electrically-driven compressor.

The high voltage battery 110 supplies the electric power, which drives the compression part 220 of the power consumption device 200 to permit the refrigerant to circulate through the refrigerating circuit. The condenser 710 performs a heat exchange between the refrigerant and the air sent in by a fan 711, permitting the refrigerant to transition from the gaseous phase to the liquid phase.

The condenser 710 discharges the refrigerant, which passes through the expansion valve 720, allowing the pressure reduction. Then, the refrigerant is provided to the evaporator 730.

The evaporator 730 performs a heat exchange between the refrigerant and the air sent in by a blower 731, permitting the refrigerant to transition from the liquid phase into the gaseous phase, again. The heat exchange allows the collection of the heat of the air.

Figure 4:
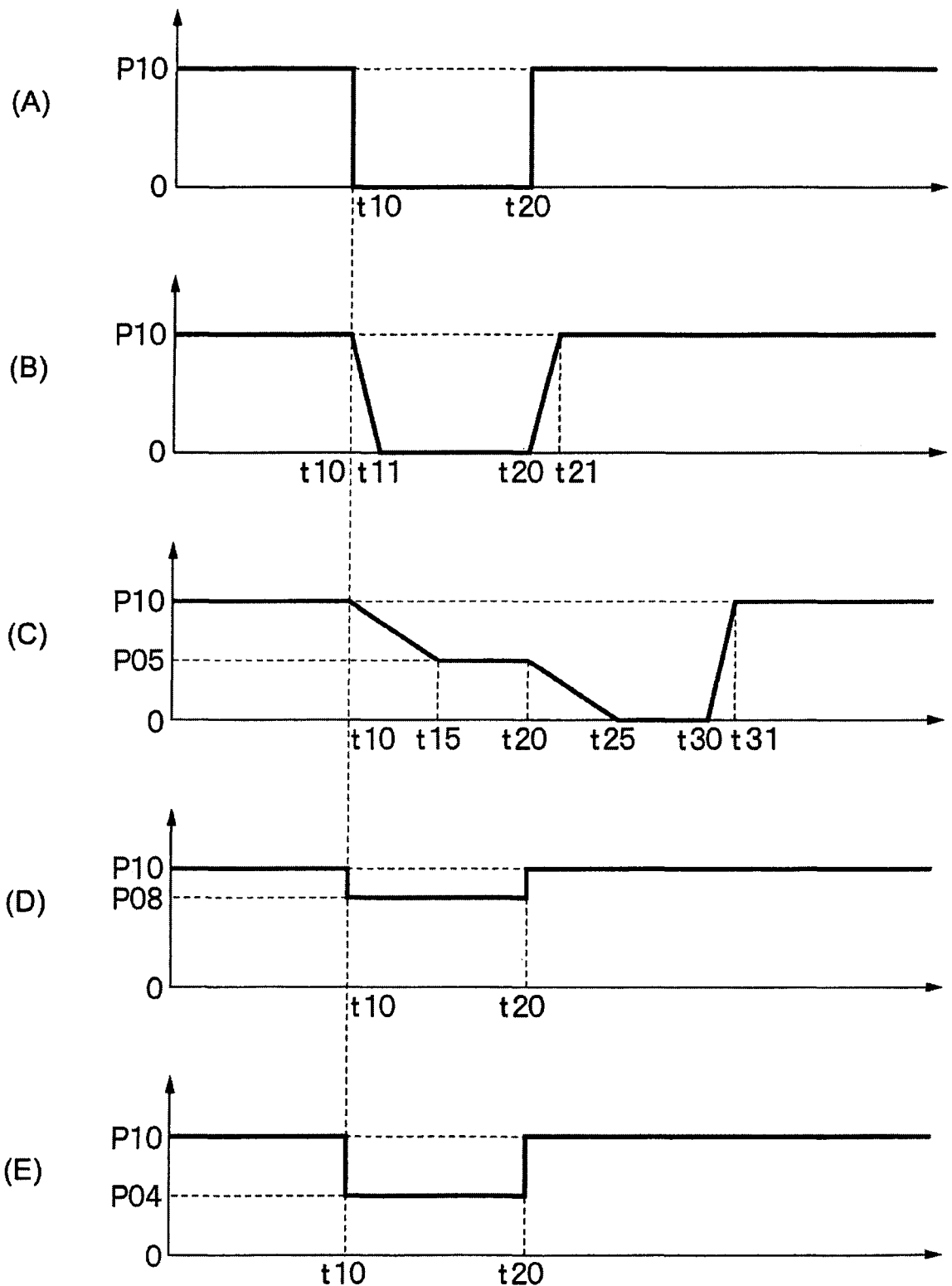
FIG. 4 is a diagram illustrating examples of changes in an electric power allocation transmitted from a first ECU.

The control performed by the first ECU 100 is explained referring to FIG. 4. The first ECU 100 monitors the electric power, which is provided to the power consumption devices 200 etc. or dynamo-electric machines for travel. A part of the dynamo-electric machines or the power consumption devices 200 etc. may be required to consume much electric power depending on a travel state of the electric vehicle; thereby, there may be arising a situation where the electric power provided from the high voltage battery 110 is insufficient.

The first ECU 100 thus suppresses the electric power provided to a low priority one among the power consumption devices 200 etc. and performs the process which secures the necessary electric power. In detail, the electric power provided to a part of the power consumption devices 200 etc. is restricted by changing the electric power allocation to the respective power consumption devices 200 etc. FIG. 4 illustrates multiple examples of the time change in the electric power allocation transmitted to the power consumption device 200. The time change in the electric power allocation transmitted to another power consumption device (300) is similar to that in FIG. 4.

In an example in (A) of FIG. 4, the electric power restriction starts at the time t10, at which the electric power allocation (the maximum value of an available electric power consumed by the power consumption device 200) is changed into 0 (zero) from the value P10. That is, the electric power is shut down instantly. Then, the electric power restriction is released at the time t20, at which the electric power allocation is returned from 0 to the value P10. That is, the electric power restriction is released instantly.

In an example in (B) of FIG. 4, the electric power restriction starts at the time t10, at which the electric power allocation starts to decrease from the value P10 with a predetermined slope and reaches 0 (zero) at the time t11. Then, the release of the power restriction is also performed with a predetermined slope; the electric power returned to an original value P10 at the time t21 after the time t20.

In an example in (C) of FIG. 4, the electric power restriction starts at the time t10, at which the electric power allocation starts to decrease from the value P10 with a predetermined slope, reaches the value P05 at the time t15, and then remains constant. Then, the electric power allocation re-starts to decrease at the time t20 and reaches 0 (zero) at the time t25. As such, the electric power allocation may be changed step by step. Then, the release of the power restriction starts to increase at the time t30 with a predetermined slope; the electric power returns to the original value P10 at the time t31 after the time t30.

In an example in (D) of FIG. 4, the electric power restriction is performed instantly like in (A) of FIG. 4; the value of the electric power allocation under the electric power restriction is not 0 (zero), but the value P08 larger than 0. In addition, the value of the electric power allocation under the electric power restriction needs not be fixed to the value P08; it may be the value P04 other than the value P08 as in (E) of FIG. 4.

As such, the changes in the electric power allocation transmitted from the first ECU 100 to the power consumption device 200 are various depending on situations where the electric power restriction is performed. FIG. 4 illustrates only the examples; the electric power allocation may be changed in other patterns. When the first ECU 100 changes the electric power allocation to transmit, the receiving second ECUs 210 etc. control operations of the respective power consumption devices 200 etc. so as to accord the change in the actual consumed electric power with the change in the electric power allocation.

The electric power restriction (suppression of the consumed electric power) performed by the second ECU 210 will be explained. First, a comparative example against the present disclosure is explained with reference to FIG. 15, which illustrates an electric power restriction performed in a mode, which is different from the second ECU 210. The configurations of the devices in this comparative example are assumed to be the same as those in FIGS. 1 to 3.

Figure 15:
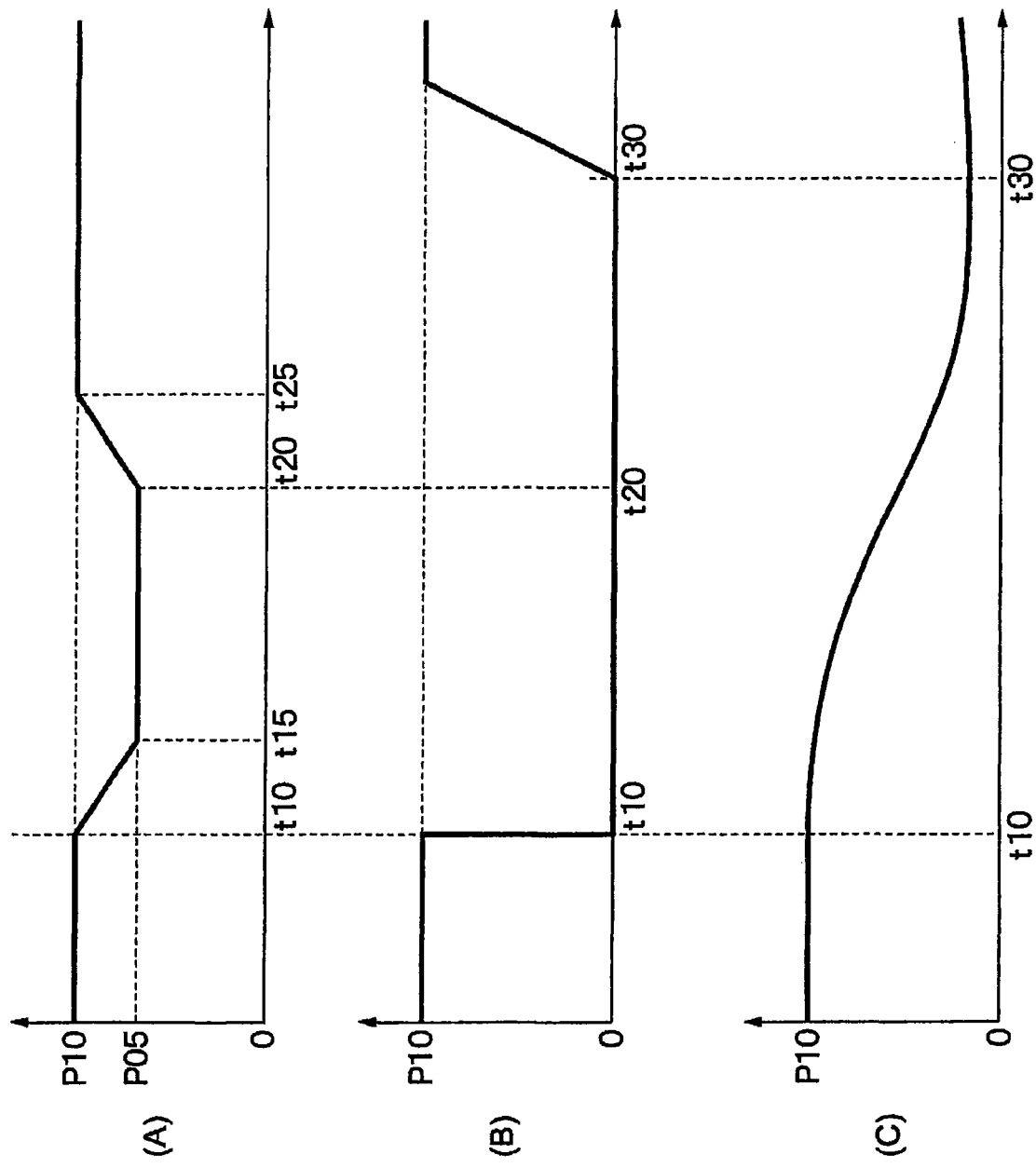
FIG. 15 is a diagram illustrating changes in an electric power allocation transmitted from a first ECU, a consumed electric power in a power consumption device, and an air temperature in a vehicle compartment in a comparative example against the present disclosure.

Here, (A) of FIG. 15 illustrates the time change of the electric power allocation transmitted from the first ECU 100 to the power consumption device 200. In contrast, (B) of FIG. 15 illustrates the time change in the consumed electric power in the power consumption device 200 when a conventional electric power restriction is performed in responding to the change in the electric power allocation as in (A) of FIG. 15. Then, (C) of FIG. 15 illustrates the time change in the temperature at the blow off of the air-conditioning system when the consumed electric power in the power consumption device 200 included in the air-conditioning system 700 changes as in (B) of FIG. 15.

As in the example of (A) of FIG. 15, the electric power restriction starts at the time t10, at which the electric power allocation starts to decrease from the value P10 with a predetermined slope and reaches the value P05 at the time t15. Then, the release of the electric power restriction starts to increase at the time t20 with a predetermined slope; the consumed electric power returns to the original value P10 at the time t25 after the time t20.

In this example, in order to respond to the electric power allocation being changed from the value P10 to the value P05, the power consumption device 200 is controlled to reduce the consumed electric power instantly to the value P05 at the time t10.

Such a rapid reduction of the consumed electric power however poses an unstable operation in the compression part 220; this fails to continue controlling normally the drive accompanied by the pressure fluctuation in the compression part 220. This results in the unstable operation of the air-conditioning system 700. As a result, as illustrated in (B) of FIG. 15, the electric power restriction in the power consumption device 200 fails to be performed suitably; thus, the consumed electric power falls to 0 (zero) (which is lower than the value P05 as a target value).

In addition, although the electric power restriction is released at and after the time t20, the actual re-booting takes a significant length of time; thus, the starting of the power consumption device 200 and the operation start of the air-conditioning system 700 take place only just at the time t30 after the time t20.

That is, the air-conditioning system 700 stops its operation (heating in this example) in a time period from the time t10 to the time t30. The temperature of the vehicle compartment falls significantly, making the occupant feel unpleasant in such a time period, as illustrated in (C) of FIG. 15.

When the electric power allocation from the first ECU 100 changes, the consumed electric power is assumed to be changed by executing constantly an identical electric power restriction. However, such executing constantly an identical electric power restriction alone may cause the power consumption device 200 or the air-conditioning system 700 to become unstable. Thus, in the present embodiment, the second ECU 210 installed in the power consumption device 200 controls to make appropriate the mode of the electric power restriction (such as a slope in the change of the consumed electric power, or a target value), thereby maintaining the operation of the devices or the system stable.

An example of the control performed by the present embodiment will be explained referring to FIG. 5. Now, (A) of FIG. 5 indicates a time change of the electric power allocation transmitted to the power consumption device 200 from the first ECU 100, the time change which is the same as that in (A) of FIG. 15. In contrast, (B) of FIG. 5 indicates the time change of the consumed electric power in the power consumption device 200 when the electric power restriction according to the present embodiment is performed. Further, (C) of FIG. 5 indicates the change of the temperature in the vehicle compartment.

Figure 5:
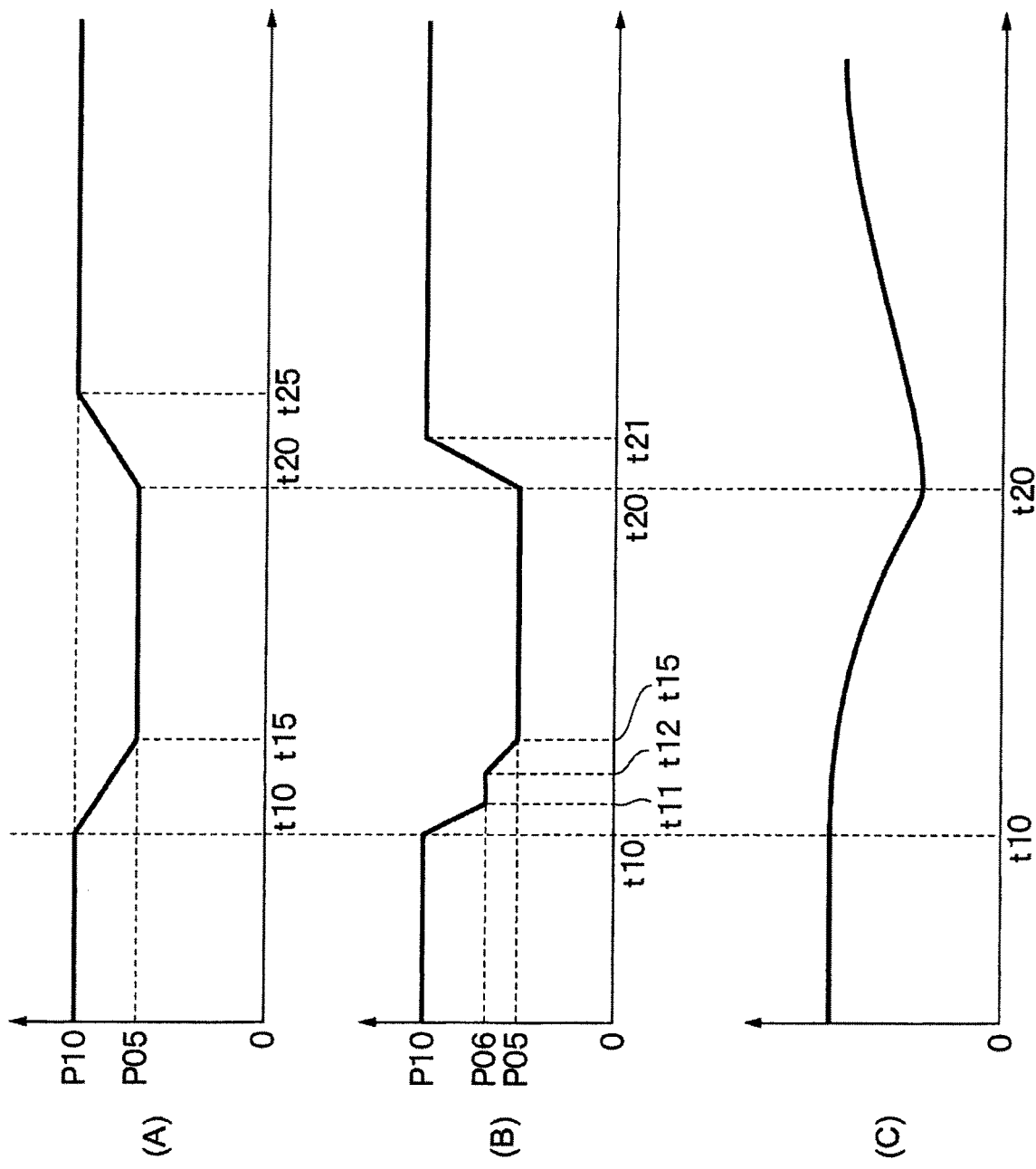
FIG. 5 is a diagram illustrating changes in an electric power allocation transmitted from a first ECU, a consumed electric power in a power consumption device, and an air temperature in a vehicle compartment.

As in (B) of FIG. 5, after the electric power restriction starts at the time t10, the consumed electric power starts to decrease with a predetermined slope, and reaches the value P06 at the time t11. Then, the consumed electric power is maintained constant for a while at the value P06; the consumed electric power is started to decrease at the time t12 after the time t11. The consumed electric power reaches the value P05 at the time t15.

As such, while controlling to nearly accord the change of the consumed electric power ((B) of FIG. 5) with the change of the electric power allocation ((A) of FIG. 5), the second ECU 210 changes the consumed electric power in a partially-changed mode by giving the priority to the stability of the operation in the compression part 220 etc. This prevents the consumed electric power from falling to 0 (zero) as in (B) of FIG. 15; the consumed electric power may be suppressed to match with an instruction of the electric power allocation transmitted from the first ECU 100. In addition, although being restricted during the period from the time t10 to the time t20, the operation of the air-conditioning system 700 is returned immediately to a usual operation after the time t20. This allows the air temperature of the vehicle compartment to fall just slightly, while maintaining the vehicle compartment at a comfortable state, as illustrated in (C) of FIG. 5.

The mode of the change of the consumed electric power for giving priority to the stability of the operation of the compression part 220 may not be limited to as in (B) of FIG. 5. It is desirable to change the consumed electric power in an appropriate mode depending on the purpose of the electric power restriction or the travel state of the electric vehicle.

For example, a slope of change of the consumed electric power after the time t10 may be steeper than the slope of the change of the electric power allocation like in the example of (B) of FIG. 5; alternatively, it may be gentler than the slope of the change of the electric power allocation. In addition, the consumed electric power may not need to be changed in a multi-step manner. As long as the stability of the operation of the compression part 220 etc. is maintained, another mode may be adopted which changes with a constant slope from the value P10 to the value P05.

In addition, in the example of (B) of FIG. 5, after the electric power restriction is released at the time t20, the consumed electric power increases gently with a predetermined slope, and is returned to the original value P10 at the time t21 after the time t20. In the above, the slope of the change is steeper than the slope with which the electric power allocation is returned ((A) of FIG. 5). The mode of the release of the electric power restriction need not be limited to that as in (B) of FIG. 5; another mode may be adopted which increases in a multi-step manner.

Figure 6:
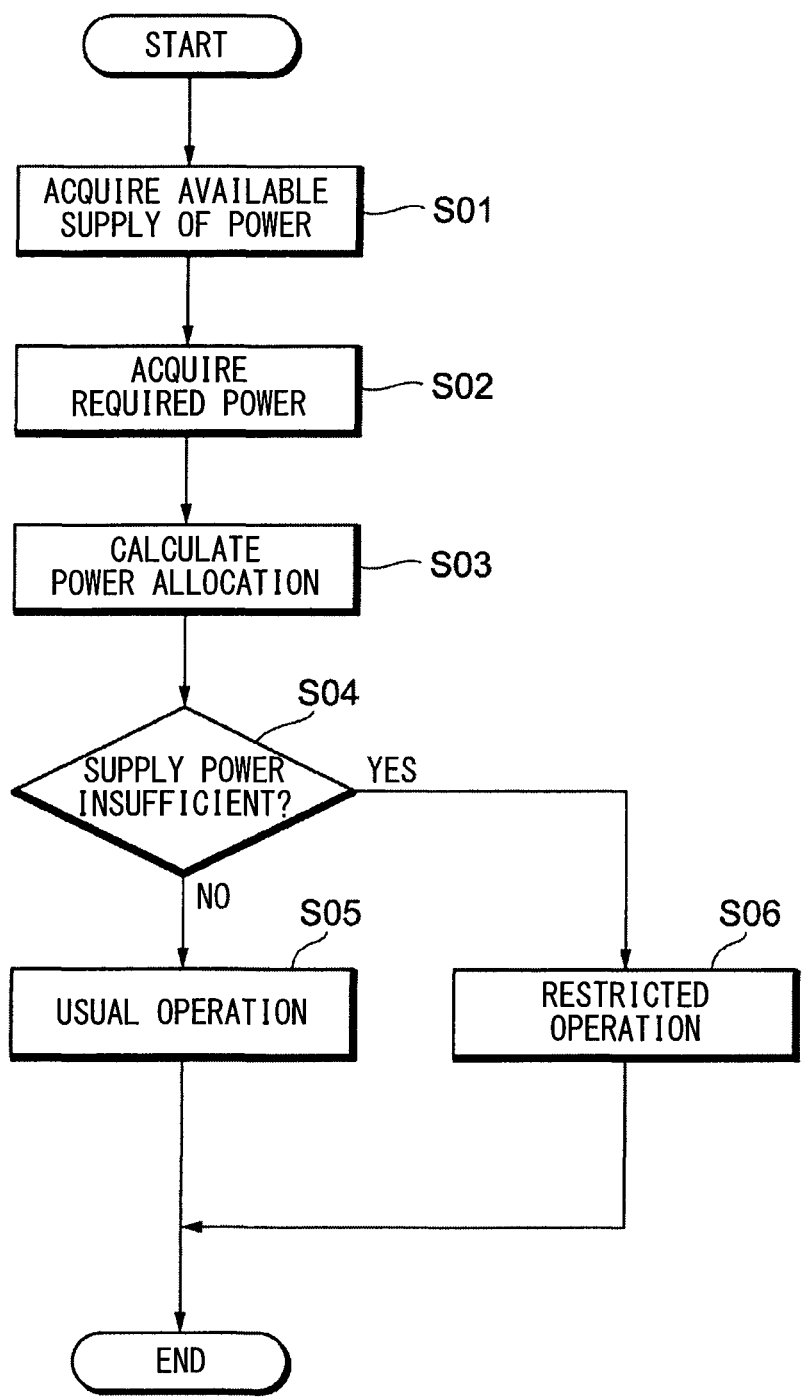
FIG. 6 is a flowchart illustrating a process executed by a first ECU.

The following explains a process performed by the first ECU 100 with reference to FIG. 6. A series of processing in FIG. 6 is repeatedly performed each time a predetermined period elapses.

It is further noted that the described flowchart includes sections (also referred to as steps), which are represented, for instance, as S01. Further, each section can be divided into several sections while several sections can be combined into a single section. Each section may be referred to as a device, a module, or a specific name; for instance, a detection section may be referred to as a detection device, a detection module, or a detector. Further, each section can be achieved not only (i) as a software section in combination with a hardware unit (e.g., computer), but also (ii) as a hardware section (e.g., integrated circuit, hard-wired logic circuit), including or not including a function of a related apparatus. Further, the hardware section may be inside of a microcomputer.

In S01, the available supply of the electric power is acquired from the high voltage battery 110. The available supply of the electric power signifies the maximum value of the electric power which can be outputted from the high voltage battery 110, and calculated based on the state (such as SOC (State of Charge)) of the high voltage battery 110.

In S02, the electric power (required power) which each of the power consumption devices 200 etc. requires is acquired. In S03, the electric power allocation to each of the power consumption devices 200 etc. is calculated based on the required power acquired in S02.

In S04, it is determined whether the electric power provided to each of the power consumption devices 200 etc. from the high voltage battery 110 is insufficient. In detail, it is determined whether the sum of (i) the electric power consumed by the dynamo-electric machine for travel, and (ii) respective required powers of the power consumption devices 200 etc. is greater than the available supply of the electric power acquired in S01. When not being greater than the available supply of the electric power, i.e., when the electric power outputted from the high voltage battery 110 is sufficient for all the required power, the sequence proceeds to S05. When being greater than the available supply of the electric power, i.e., when the electric power outputted from the high voltage battery 110 is not sufficient, the sequence proceeds to S06.

In S05, a usual operation is performed while the electric power restriction is not performed. That is, each of the power consumption devices 200 etc. is supplied with the electric power as the required power from the high voltage battery 110. In S06, the electric power restriction is performed as explained with reference to FIG. 5.

Figure 7:
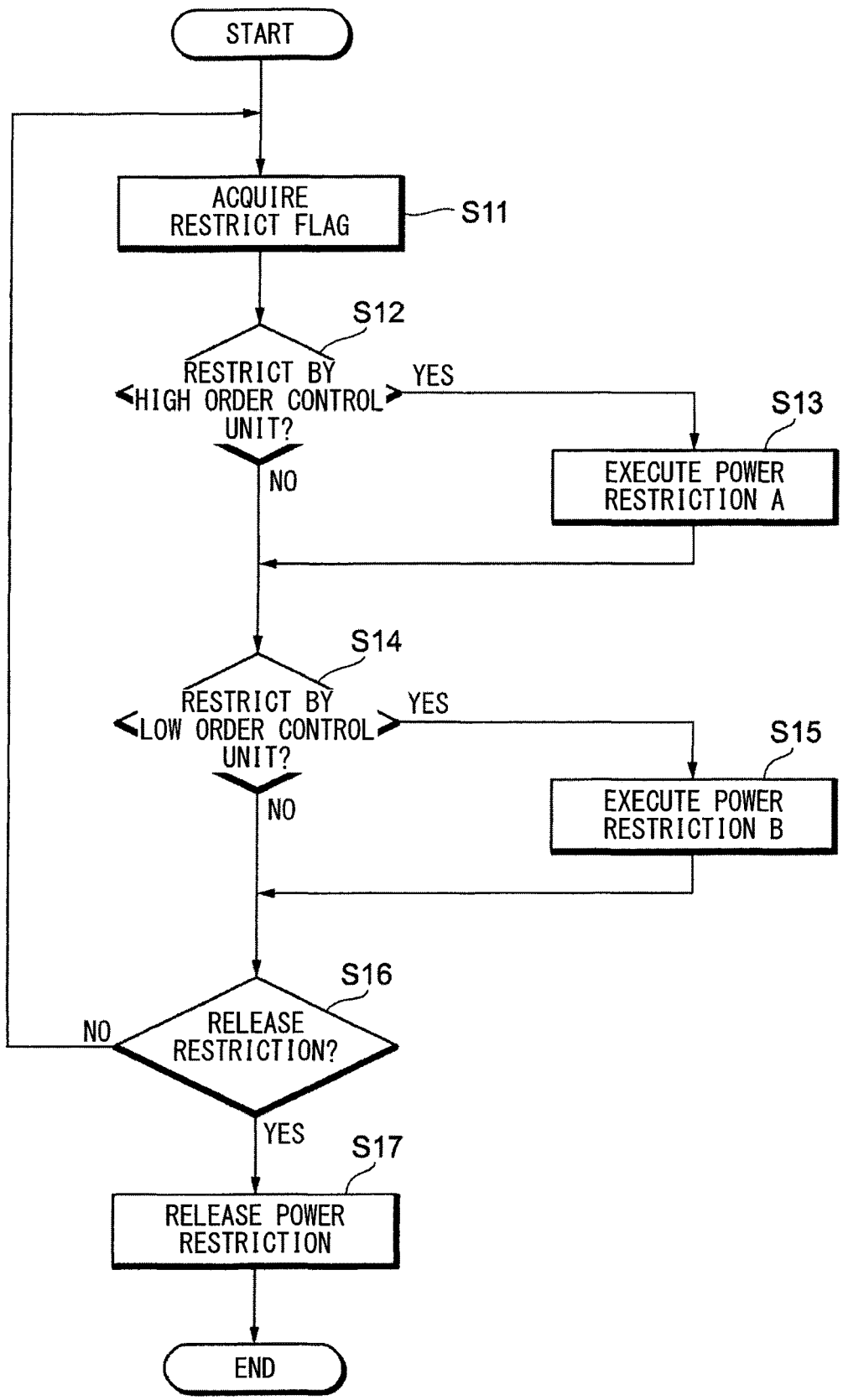
FIG. 7 is a flowchart illustrating a process executed by a second ECU.

The following explains a process performed by the second ECU 210 with reference to FIG. 7. A series of processing in FIG. 7 is repeatedly performed each time a predetermined period elapses.

In S11, a restriction flag is acquired from the first ECU 100. The restriction flag is a signal that includes the information on a specific mode or processing of the electric power restriction. The restriction flag includes the slopes of the change or the values of the electric power allocation during the electric power restriction. In addition, the restriction flag includes an instruction indicating which one of the high order control unit 211 and the low order control unit 212 is used to perform the electric power restriction.

In S12, it is determined whether or not the electric power restriction is performed by the high order control unit 211 based on the acquired restriction flag. When it is determined that it is performed by the high order control unit 211; the sequence proceeds to S13.

In S13, the electric power restriction A is executed. The second ECU 210 prepares multiple modes of the electric power restriction, previously according to purposes of the electric power restriction. The electric power restriction A indicates generally a mode, which is executed by the high order control unit 211, among the multiple modes. A process that determines a specific restriction mode from within the electric power restriction A will be explained later with reference to FIG. 8.

When it is determined in S12 that the high order control unit 211 does not perform the electric power restriction, or when S13 is completed, the sequence proceeds to S14. In S14, it is determined whether or not the electric power restriction is performed by the low order control unit 212 based on the acquired restriction flag. When it is determined that it is performed by the low order control unit 212, the sequence proceeds to S15.

In S15, the electric power restriction B is executed. The electric power restriction B indicates generally a mode (form), which is executed by the low order control unit 212, among the multiple modes previously designated. A process that determines a specific restriction mode from within the electric power restriction B is similar to that in the electric power restriction A that will be explained later with reference to FIG. 8.

When it is determined in S14 that the low order control unit 212 does not perform the electric power restriction, or when S15 is completed, the sequence proceeds to S16. In S16, it is determined whether the electric power restriction is to be released. This determination is performed based on the restriction flag acquired in S11. When it is determined that the electric power restriction is to be released, the sequence proceeds to S17.

In S17, the electric power restriction is released; the consumed electric power in the power consumption device 200 is returned to the value before the electric power restriction is executed. When it is determined in S16 that the electric power restriction is not to be released, the processing after S11 is executed again.

The detailed process in S13 of FIG. 7, i.e., the process which determines a specific restriction mode within the electric power restriction A, will be explained with reference to FIG. 8. A specific process in S15 of FIG. 7 is similar to that in S13; the explanation is omitted.

In S21, the restriction mode flag is acquired from the first ECU 100. The restriction mode flag is, like the restriction flag, a signal that includes the information on a specific mode or processing of the electric power restriction. The restriction mode flag includes more specific information which is needed in order to determine the mode of the electric power restriction. The restriction mode flag may be integrated into the restriction flag.

In S22, the value of the electric power allocation at the present time is acquired from the first ECU 100.

In S23, a specific mode of the electric power restriction A is determined based on the restriction mode flag and the electric power allocation which are acquired. In the present embodiment, n modes from the restriction mode A1 to the restriction mode An are previously designated as multiple modes of the electric power restriction A. These modes are mutually different in the slopes of the change of the consumed electric power or the number of steps of the change of the consumed electric power when transitioning into the state of the electric power restriction. In S23, an appropriate mode of the electric power restriction is determined according to the electric power allocation.

After a specific mode of the electric power restriction A is determined in S23, the electric power restriction is executed in the specific mode determined (S24, S25, S26). This maintains the state of the operation of the compression part 220 or the air-conditioning system 700 stable while performing the electric power restriction appropriately.

Second Embodiment

A second embodiment of the present disclosure will be explained with reference to FIG. 9. In the present embodiment, a process that determines a specific mode of the electric power restriction A (or the electric power restriction B) is different from the first embodiment. The process performed by the second embodiment replaces a series of processing as in FIG. 8 with a series of processing as in FIG. 9.

Figure 8:
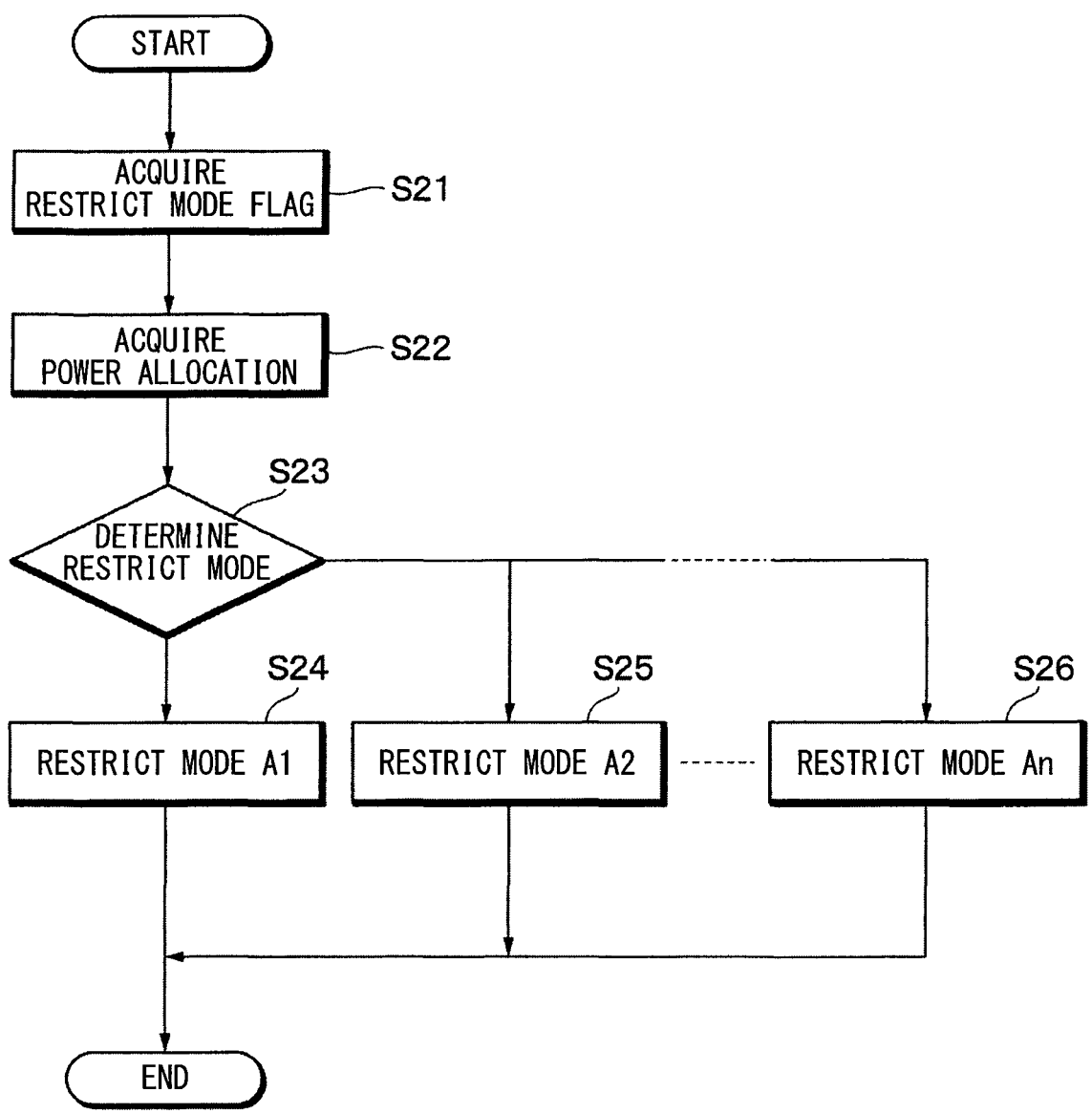
FIG. 8 is a flowchart illustrating a process executed by a second ECU.
Figure 9:
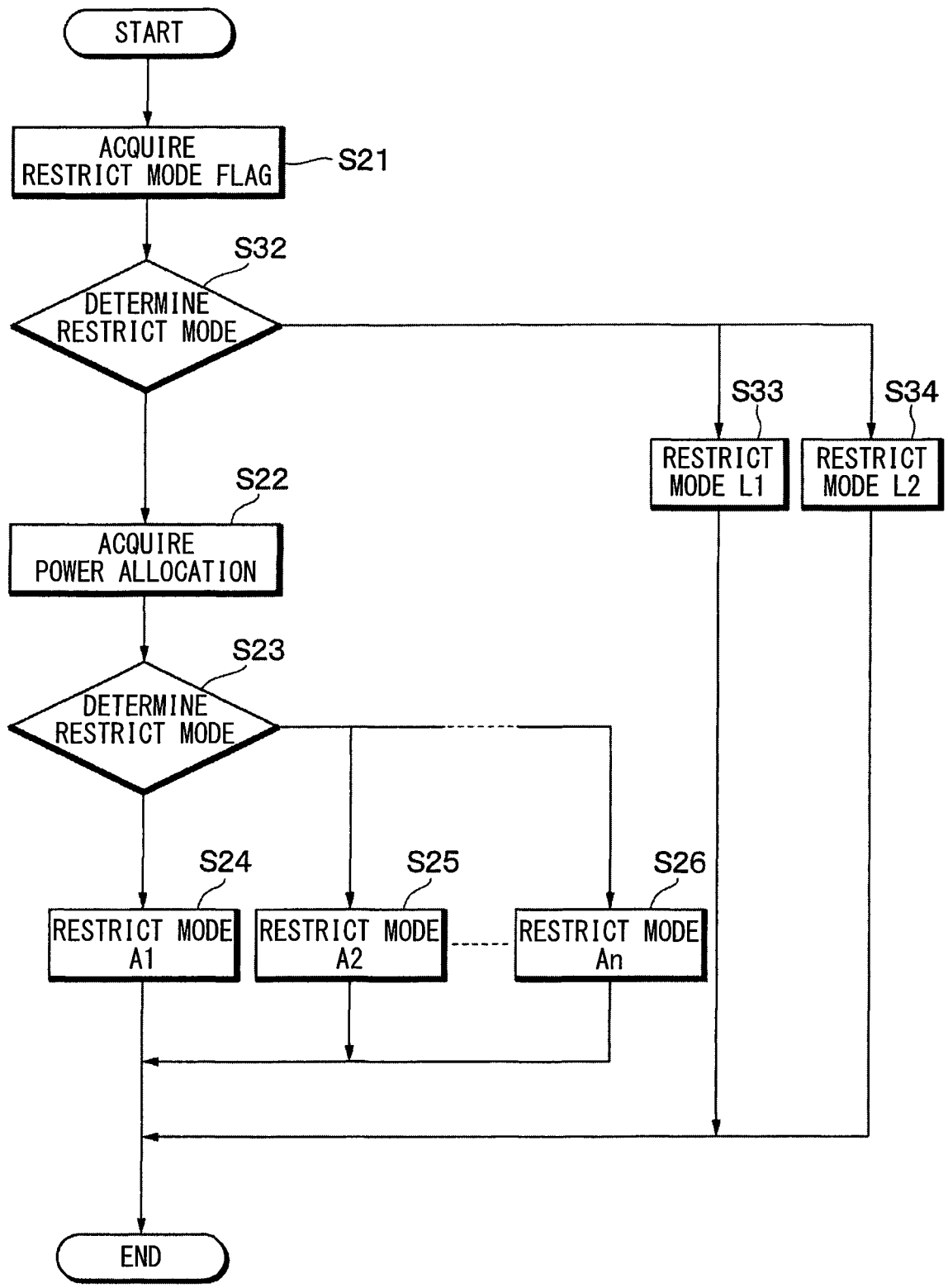
FIG. 9 is a flowchart illustrating a process executed by a second ECU in a power control system according to a second embodiment of the present disclosure.

A series of processing as in FIG. 9 are added with the processing of S32, S33, and S34 to FIG. 8. Of the processing in FIG. 9, the processing identical to that in FIG. 8 such as S21 is assigned with the identical sign. The following will explain only S32, S33, and S34.

In S32 performed after S21, the mode of the electric power restriction is determined; namely, it is determined whether an instruction indicating a specific mode is included in the restriction mode flag. When any instruction is not included in the restriction mode flag, the sequence proceeds to S22 and the same processing as that explained in the above is performed.

When an instruction indicating a specific mode of the electric power restriction is included in the restriction mode flag, the second ECU 210 performs the electric power restriction in the mode designated (forcibly) from the first ECU 100, instead of determining independently the mode of the electric power restriction. In the present embodiment, the two modes, i.e., the restriction mode L1 or the restriction mode L2 may be transmitted from the first ECU 100.

When the restriction mode L1 is designated from the first ECU 100, the sequence moves from S32 to S33, where the electric power restriction is executed in the restriction mode L1. The restriction mode L1 sets the consumed electric power instantly to 0 (zero) at the same time when the electric power restriction starts. This may cause the operation of the compression part 220 etc. unstable; however, the electric power restriction is performed in accordance with the instruction from the first ECU 100.

When the restriction mode L2 is designated from the first ECU 100, the sequence moves from S32 to S34, where the electric power restriction is executed in the restriction mode L2. The restriction mode L2 starts to reduce, to a predetermined value, the consumed electric power with a predetermined slope at the same time when the electric power restriction starts. Such a predetermined value and such a predetermined slope each are in accordance with the instruction from the first ECU 100.

Thus, in the present embodiment, the second ECU 210 does not determine the mode of the electric power restriction based on the electric power ratio (by it's independent determination); instead, the mode of the electric power restriction may be forcibly determined to be in accordance with the instruction from the first ECU 100. For example, when the electric power for travel needs to be certainly secured for sudden acceleration, the mode of the electric power restriction is determined forcibly as above. By contrast, when urgency or reliability is not required for securing the electric power, the processing from S22 (the same process as the first embodiment) is performed.

Third Embodiment

A third embodiment of the present disclosure will be explained with reference to FIG. 10. Now, (A) of FIG. 10 indicates the time change of the electric power allocation transmitted to the power consumption device 200 from the first ECU 100. In contrast, (B) of FIG. 10 illustrates the change of the consumed electric power in the power consumption device 200.

The electric power allocation is transmitted from the first ECU 100 to the second ECU 210 each a predetermined communication period elapses. This makes it difficult to decrease the electric power allocation with a predetermined slope as in (A) of FIG. 5, for instance. Thus, in the present embodiment, the first ECU 100 transmits the electric power allocation with the mode of instant restriction and instant release as in (A) of FIG. 10; the second ECU 210 performs the electric power restriction or the release of the electric power restriction with a gentle slope. See, in (B) of FIG. 10, a period from the time t10 to the time t15 or a period from the time t20 to the time t21. Even if such a period is shorter than a communication period, the electric power restriction may be performed appropriately without being affected by the delay due to the communication.

Figure 10:
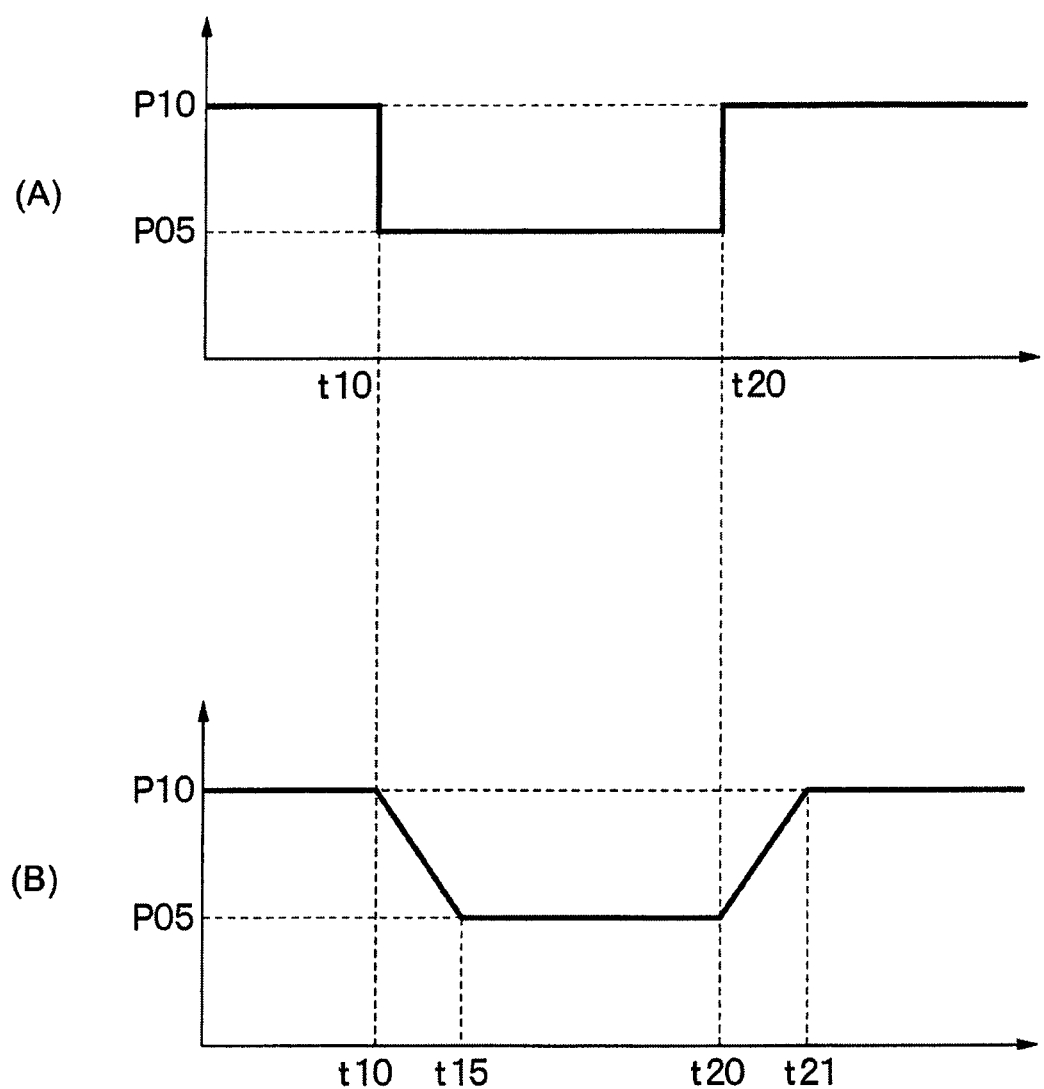
FIG. 10 is a diagram illustrating examples of changes in electric power allocation transmitted from a first ECU and a consumed electric power in a power consumption device according to a third embodiment of the present disclosure.

Note that the control achieving the change of the consumed electric power as in (B) of FIG. 10, which is made to the driver 250, may be performed by either the high order control unit 211 or the low order control unit 212 of the second ECU 210. For example, when the necessary change of the consumed electric power is comparatively slow, the high order control unit 211 controls the driver 250 indirectly. By contrast, when the necessary change of the consumed electric power is comparatively fast, the low order control unit 212 controls the driver 250; in such a case, while the high order control unit 211 transmits the electric power allocation, as it is transmitted from the first ECU 100, to the low order control unit 212, which will perform the electric power restriction.

The mode of the electric power restriction performed by the second ECU 210 is not limited to the mode as shown in FIG. 10. For example, another mode illustrated in FIG. 11 may be adopted.

Figure 11:
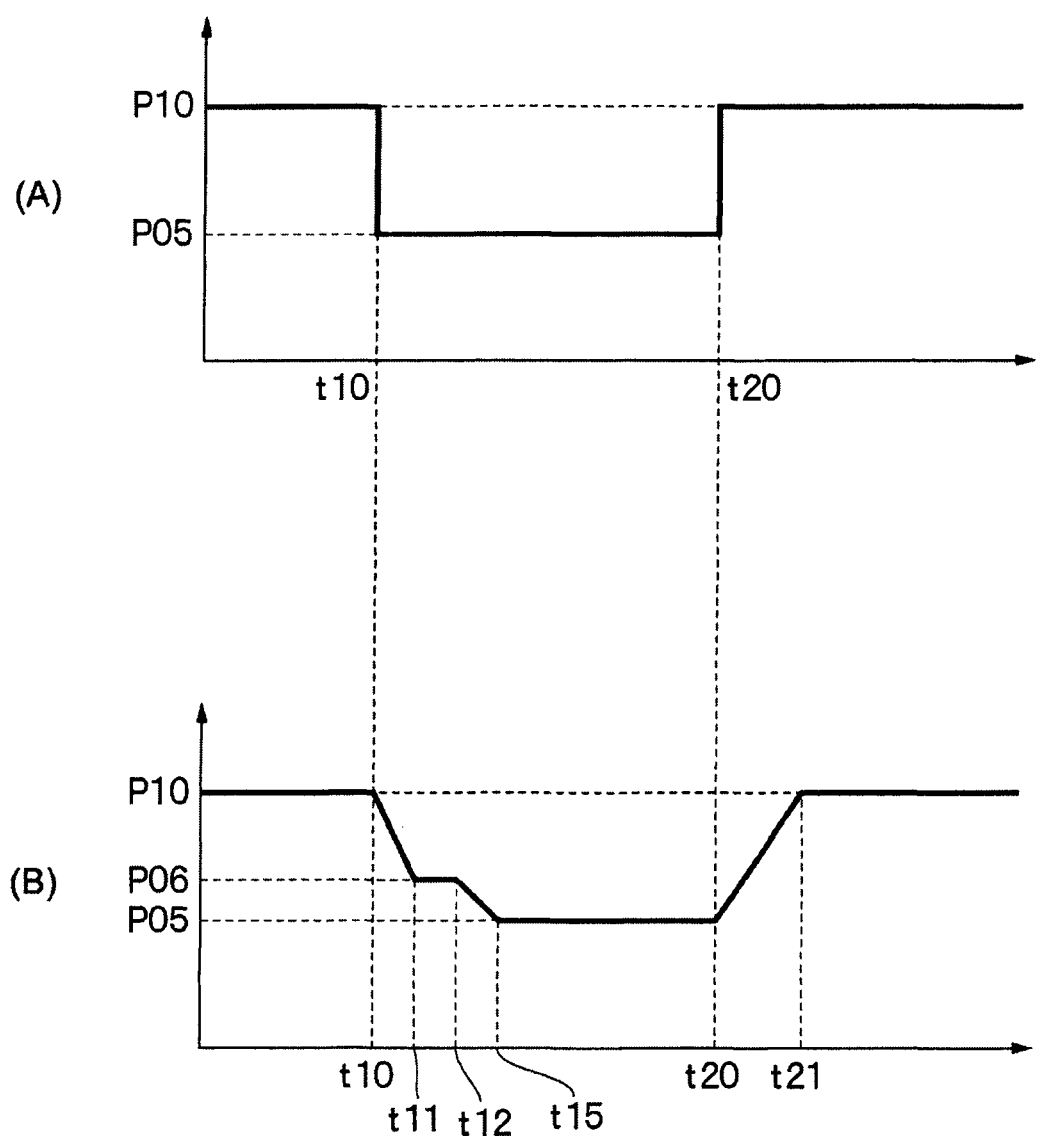
FIG. 11 is a diagram illustrating other examples of changes in an electric power allocation transmitted from a first ECU, and a consumed power in a power consumption device.

Now, (A) of FIG. 11 indicates the time change of the electric power allocation transmitted to the power consumption device 200 from the first ECU 100, the time change which is the same as that in (A) of FIG. 10. Upon receiving the instruction (electric power allocation) of the time change as in (A) of FIG. 11 from the first ECU 100, the second ECU 210 may perform the electric power restriction in a multi-step manner as in (B) of FIG. 11. Here, the change shape of the multi-step manner in (B) of FIG. 11 is the same as that in (B) of FIG. 5. Similarly, the electric power restriction may be performed by either the high order control unit 211 or the low order control unit 212.

Fourth Embodiment

The above-explained embodiments provide the control that intends to accord the value of the consumed electric power in the electric power restriction with the electric power allocation transmitted from the first ECU 100. Alternatively, another control may be adopted which makes the value of the consumed electric power in the electric power restriction with a value lower than the electric power allocation by a predetermined margin. Such a mode can prevent the electric power outputted from the high voltage battery 110 from being insufficient even if the electric power variation or an error of the measurement arises.

Fifth Embodiment

When the electric power restriction is performed, the operation state of the air-conditioning system 700 may be changed cooperatively. For instance, when the operation of the compression part 220 is suppressed by the electric power restriction, the flow amount of the refrigerant sent into the condenser 710 (FIG. 3) falls, thereby reducing the internal pressure in the condenser 710. As a result, the balance of the air-conditioning system 700 collapses, requiring time for returning to an original state.

Thus, when the electric power restriction is performed, an interlocked control may be made which suppresses the number of rotations of the fan 711 and thereby increases the refrigerant temperature in the condenser 710. With the increase of the refrigerant temperature, the reduction of the internal pressure in the condenser 710 is suppressed; the air-conditioning system 700 is thus maintained in a state almost equivalent to a usual operation. This permits the prompt return to an original state after the electric power restriction is released.

Sixth Embodiment

The above is a case that the operation state of the air-conditioning system 700 is changed into a restricted operation in conjunction with the electric power restriction. In such a case, the release subsequent to the electric power restriction may be preferably made after the operation state of the air-conditioning system 700 is returned to a normal state and becomes under a stable state. The operation of the air-conditioning system 700 under a stable state may be determined whether a blow off temperature or a refrigerant temperature becomes constant, for example. The present embodiment can prevent the frequent change of the operation of the air-conditioning system from making an occupant feel a sense of discomfort.

Seventh Embodiment

Depending on a configuration of the air-conditioning system 700, the selected and executed mode of the electric power restriction may be changed. For example, the mode of the electric power restriction may be differentiated depending on whether the air-conditioning system is configured to be as a cooler system or a heat pump system. The cooler system is relatively less apt to be unstable; the electric power restriction may be adopted which changes rapidly the consumed electric power. The heat pump system is relatively apt to be unstable; the electric power restriction may be preferably adopted which changes gently the consumed electric power.

Eighth Embodiment

Figure 12:
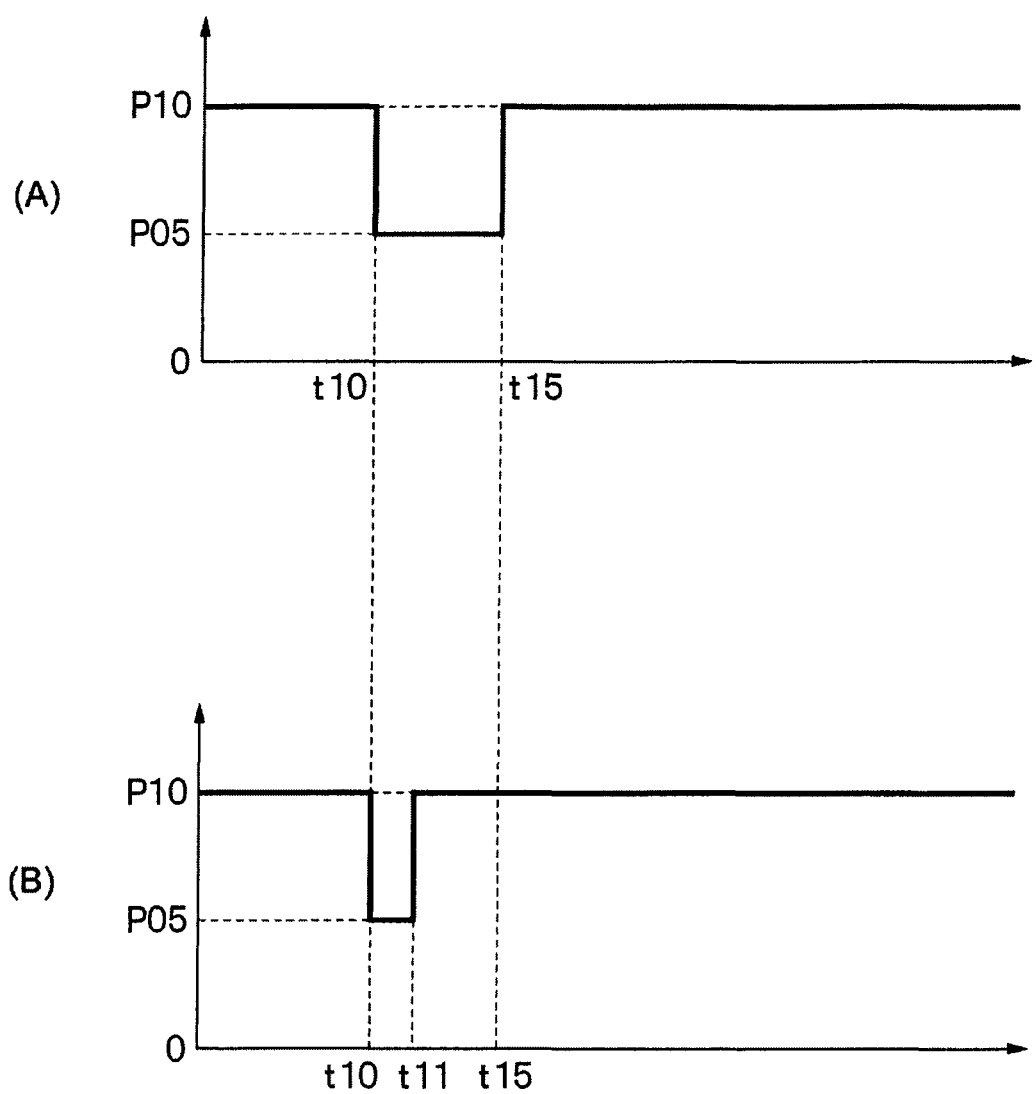
FIG. 12 is a diagram illustrating examples of changes in electric power allocation transmitted from a first ECU and a consumed electric power in a power consumption device according to an eighth embodiment of the present disclosure.

An eighth embodiment of the present disclosure will be explained with reference to FIG. 12. Now, (A) of FIG. 12 indicates the time change of the electric power allocation transmitted to the power consumption device 200 from the first ECU 100. In contrast, (B) of FIG. 12 illustrates the change of the consumed electric power in the power consumption device 200.

The period for performing the electric power restriction is supposed to be very short (from the time t10 to the time t11), and also shorter than the period of the communication between the first ECU 100 and the second ECU 210. In such a case, the instruction for releasing the electric power restriction from the first ECU 100 comes to reach the second ECU 210 at the time t15 after the time t11, as in (A) of FIG. 12. This may cause the period for the electric power restriction to be longer than the needed.

The present embodiment makes the first ECU 100 transmit previously the length of the period for performing the electric power restriction to the second ECU 210 at the time of the time t10. When the length of a period for performing the electric power restriction process is shorter than a predetermined threshold value, the second ECU 210 releases the electric power restriction at the time (time t11) after the above length elapses without waiting for an instruction from the first ECU 100. This performs appropriately the electric power restriction even if a very short period is designated.

Ninth Embodiment

A ninth embodiment of the present disclosure will be explained with reference to FIG. 13. Now, (A) of FIG. 13 indicates the time change of the electric power allocation transmitted to the power consumption device 200 from the first ECU 100. In contrast, (B) of FIG. 13 illustrates the change of the consumed electric power in the power consumption device 200.

Figure 13:
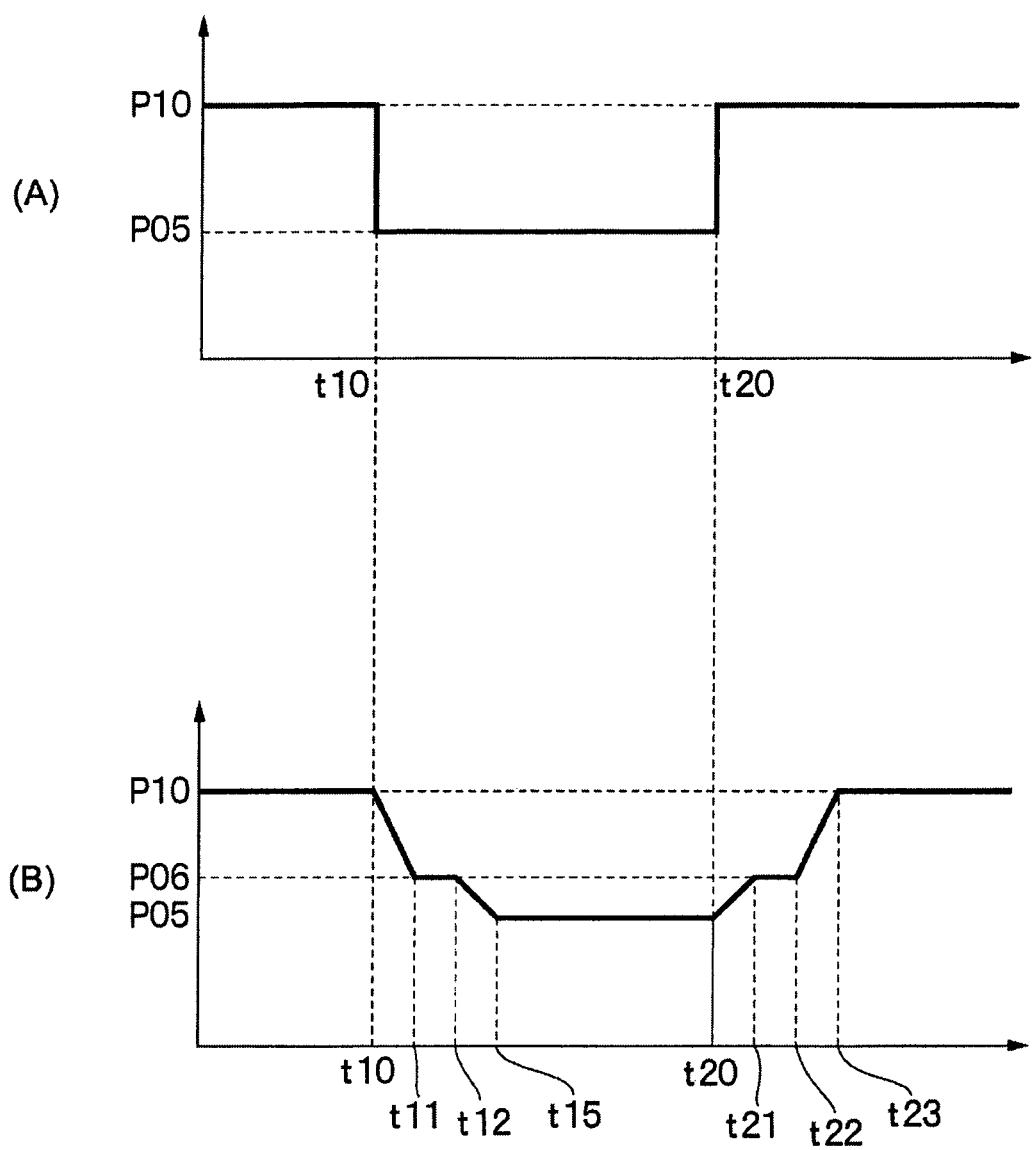
FIG. 13 is a diagram illustrating examples of changes in electric power allocation transmitted from a first ECU and a consumed electric power in a power consumption device according to a ninth embodiment of the present disclosure.

In an example in (B) of FIG. 13, the electric power restriction is restricted with a multi-step manner in the period from the time t10 as the starting time to the time t15, similar to (B) of FIG. 5. Further, the consumed electric power is returned in a multi-step manner since the time t20. In detail, after the electric power restriction is released at the time t20, the electric power allocation increases from the value P05 with a predetermined slope. After the electric power allocation becomes the value P06 at the time t21, the electric power allocation remains constant for a while. Then, the electric power allocation re-starts to increase at the time t22 and reaches the original value P10 at the time t23.

In the present embodiment, when the load before the electric power restriction is performed is large, the release of the electric power restriction is performed with a multi-step manner, as illustrated in (B) of FIG. 13. This suppresses the occurrence of the hunting etc., while maintaining the stability of the operations of the compression part 220 and the air-conditioning system 700 also when the electric power restriction is released.

Tenth Embodiment

Figure 14:
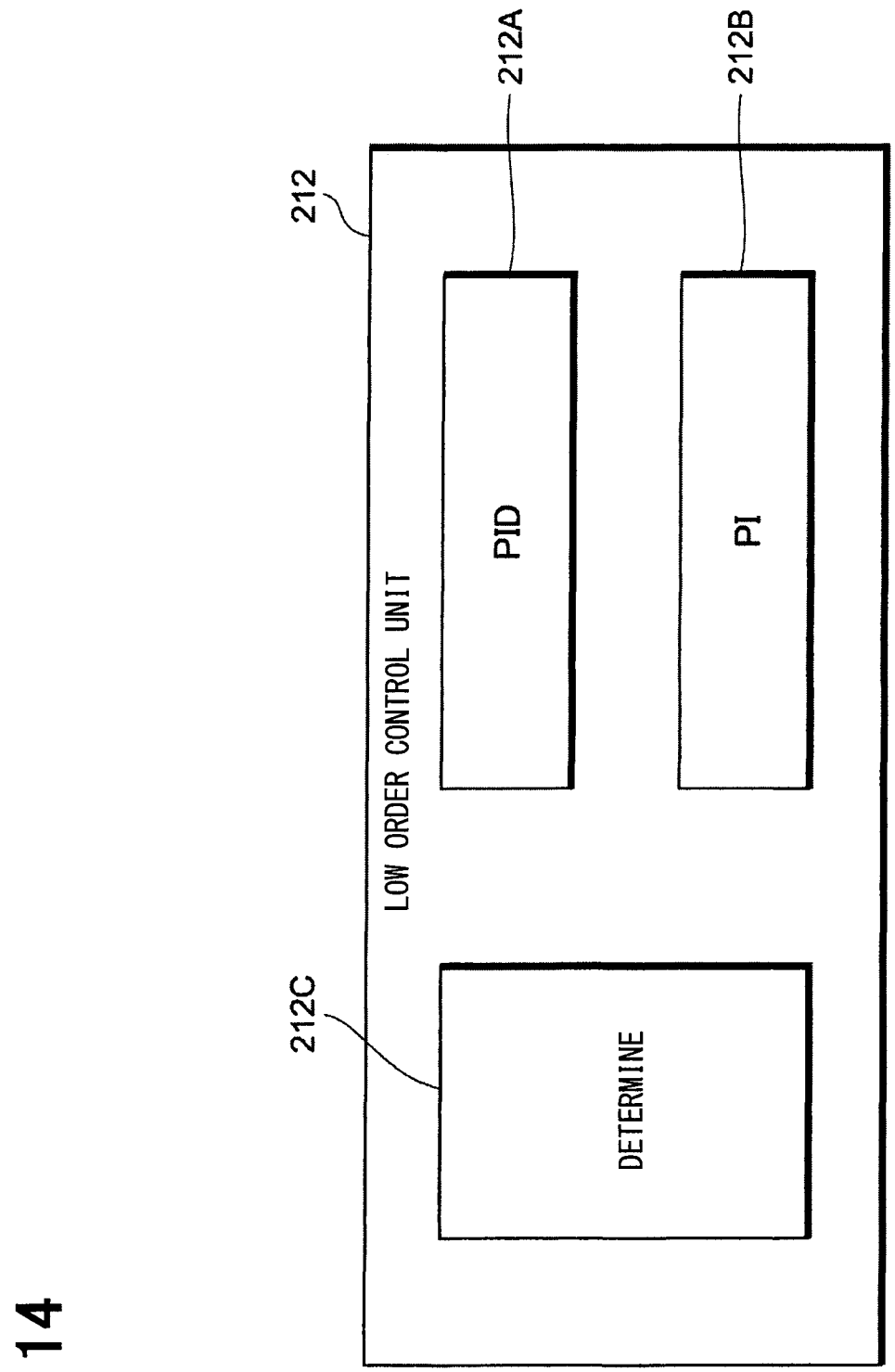
FIG. 14 is a diagram illustrating an overall configuration of a second ECU in a power control system according to a tenth embodiment of the present disclosure.

A tenth embodiment of the present disclosure will be explained with reference to FIG. 14. FIG. 14 illustrates schematically a configuration of the low order control unit 212 of the second ECU 210.

The second ECU 210 according to the present embodiment includes a PID control unit 212A and a PI control unit 212B. Each of these units serves as a controller for according the value of the electric power consumed in the power consumption device 200 (i.e., the value of the electric power provided to the power consumption device 200 from the high voltage battery 110) with a target value.

The determination device 212C determines whether to use the PID control unit 212A or the PI control unit 212B. The determination device 212C switches the control units so as to use more appropriately based on the purpose of the electric power restriction.

For example, when the electric power restriction is performed for the purpose of recovering SOC of the high voltage battery 110, it is not necessary to change the consumed electric power rapidly. The determination device 212C therefore switches the control units so as to permit the PI control unit 212B that has a slow response to control the electric power.

By contrast, for example, when the electric power restriction is performed for the purpose of accelerating the electric vehicle suddenly, it is necessary to change the consumed electric power within a short time, and to provide the large electric power from the high voltage battery 110 to the dynamo-electric machine. The determination device 212C therefore switches the control units so as to permit the PID control unit 212A that has a quick response to control the electric power. The low order control unit 212 may be configured to further include another control unit (e.g., a Hoc control unit).

The switching of the control units may be performed, for example based on the slope of a rotational speed instruction of the electric motor 230, the variation of the electric power before and after performing the electric power restriction. In addition, the PID control unit 212A, the PI control unit 212B, and the determination device 212C may be provided not only in the low order control unit 212 but also in the high order control unit 211.

Note that the switching of the control units signifies the switching from the PID control unit 212A to the PI control unit 212B, and the changing of a proportional gain of the PID control unit 212A.

Eleventh Embodiment

In the above-mentioned embodiments, the first ECU 100 gives the priority to each of the power consumption devices 200 etc. in allocating the electric power to achieve an appropriate electric power allocation according to a purpose of the electric power restriction. Another alternative example may be adopted in which the second ECUs 210 etc. installed in the respective power consumption devices 200 etc. determine the allocation of the electric power by communicating with each other.

In such a case, the electric power consumed in a dynamo-electric machine for travel is first subtracted from the available supply of the electric power of the high voltage battery 110; then, the remaining electric power is allocated to the power consumption devices 200 etc. The electric power allocation is desirably calculated appropriately based on the required power of the power consumption devices 200 etc.

Twelfth Embodiment

The mode of the release of the electric power restriction for releasing the state of the electric power restriction (e.g., the processing after the time t20 in (B) of FIG. 5) may be previously prepared as multiple modes, like the modes of the start process of the electric power restriction. In such a case, an appropriate mode of the release may be selected and executed depending on each of the purposes at the time of performing the electric power restriction.

Although the present disclosure is described based on the embodiment, it is understood that the present disclosure does not need to be limited to the embodiment or its configuration. The present disclosure also includes various modification examples and modifications within a scope of an equivalent. In addition, various combinations or embodiments, and other combinations or embodiments which contain only a single element, more than one element, or less than it may be included within a scope or concept of the present disclosure.

What is claimed is:

1. A power control system that supplies electric power to a plurality of power consumption devices that are provided to an electric vehicle, the power control system comprising:
   a high voltage battery that is an electric power supply source;
   a plurality of device controllers each of which is provided to a corresponding power consumption device among the plurality of power consumption devices to control an operation of the corresponding power consumption device; and
   an overall controller that overall controls the plurality of device controllers, wherein:
   at least one device controller among the plurality of device controllers performs an electric power restriction that restricts a consumed electric power in the corresponding power consumption device to cause the consumed electric power in the corresponding power consumption device to fall within an electric power range in an electric power allocation by the overall controller while simultaneously maintaining an operation of the corresponding power consumption device stably;

at least one device controller among the device controllers to perform the electric power restriction includes a high order control unit with a longer processing period, and a low order control unit with a shorter processing period; and the electric power restriction is performed by the high order control unit.

2. The power control system according to claim 1, wherein the electric power restriction is previously provided with a plurality of modes; and an appropriate mode among the modes is selected and executed depending on the electric power range in the electric power allocation.

3. The power control system according to claim 1, wherein the electric power range in the electric power allocation is adjusted based on a required electric power from each of the power consumption devices.

4. The power control system according to claim 1, wherein the overall controller allocates the electric power range while giving a priority to each of the device controllers to achieve appropriately the electric power allocation according to a purpose of the electric power restriction.

5. The power control system according to claim 2, wherein the modes of the electric power restriction are previously determined, respectively, according to purposes of the electric power restriction.

6. The power control system according to claim 1, wherein when the electric power restriction is started, the electric power restriction controls to accord a change in the consumed electric power of the corresponding power consumption device with a change in the electric power allocation while simultaneously preventing the consumed electric power of the corresponding power consumption device from falling to zero.

7. The power control system according to claim 1, wherein one consumption device among the power consumption devices is included in an air-conditioning system provided in the electric vehicle; and a mode of the electric power restriction is selected and executed depending on a configuration of the air-conditioning system.

8. A power control system that supplies electric power to a plurality of power consumption devices that are provided to an electric vehicle, the power control system comprising:

a high voltage battery that is an electric power supply source;

a plurality of device controllers each of which is provided to a corresponding power consumption device among the plurality of power consumption devices to control an operation of the corresponding power consumption device; and an overall controller that overall controls the plurality of device controllers, wherein:

at least one device controller among the plurality of device controllers performs an electric power restriction that restricts a consumed electric power in the corresponding power consumption device to cause the consumed electric power in the corresponding power consumption device to fall within an electric power range in an electric power allocation by the overall controller while simultaneously maintaining an operation of the corresponding power consumption device stably;

at least one device controller among the device controllers to perform the electric power restriction includes a high order control unit with a longer processing period, and a low order control unit with a shorter processing period; and the high order control unit performs a process which receives the electric power range from the overall controller, whereas the low order control unit performs the electric power restriction.

9. The power control system according to claim 8, wherein the electric power restriction is previously provided with a plurality of modes; and an appropriate mode among the modes is selected and executed depending on the electric power range in the electric power allocation.

10. The power control system according to claim 8, wherein the electric power range in the electric power allocation is adjusted based on a required electric power from each of the power consumption devices.

11. The power control system according to claim 8, wherein the overall controller allocates the electric power range while giving a priority to each of the device controllers to achieve appropriately the electric power allocation according to a purpose of the electric power restriction.

12. The power control system according to claim 8, wherein the low order control unit switches a mode of the electric power restriction.

13. The power control system according to claim 8, wherein:

one consumption device among the power consumption devices is included in an air-conditioning system provided in the electric vehicle; and a mode of the electric power restriction is selected and executed depending on a configuration of the air-conditioning system.

14. The power control system according to claim 8, wherein:

at least one device controller among the device controllers includes a plurality of control units to accord a value of the electric power supplied to the corresponding power consumption device with a target value; and the low order control unit of the at least one device controller switches the plurality of control units depending on a purpose of the electric power restriction.

15. The power control system according to claim 8, wherein when the electric power restriction is started, the electric power restriction controls to accord a change in the consumed electric power of the corresponding power consumption device with a change in the electric power allocation while simultaneously preventing the consumed electric power of the corresponding power consumption device from falling to zero.

16. A power control system that supplies electric power to a plurality of power consumption devices that are provided to an electric vehicle, the power control system comprising:

a high voltage battery that is an electric power supply source;

a plurality of device controllers each of which is provided to a corresponding power consumption device among the plurality of power consumption devices to control an operation of the corresponding power consumption device; and an overall controller that overall controls the plurality of device controllers, wherein:

at least one device controller among the plurality of device controllers performs an electric power restriction that restricts a consumed electric power in the corresponding power consumption device to cause the consumed electric power in the corresponding power consumption device to fall within an electric power range in an electric power allocation by the overall controller while simultaneously maintaining an operation of the corresponding power consumption device stably;

after the electric power restriction is completed, a restriction release is performed which returns a state where the electric power restriction is performed into a state where the electric power restriction is released;

the restriction release is provided with a plurality of modes;

an appropriate mode among the modes is selected and executed according to a purpose of the electric power restriction; and when a time length during which the electric power restriction is performed is shorter than a predetermined threshold value, the device controller starts to perform the restriction release without waiting for an instruction from the overall controller.

17. The power control system according to claim 16, wherein the electric power restriction is previously provided with a plurality of modes; and an appropriate mode among the modes is selected and executed depending on the electric power range in the electric power allocation.

18. The power control system according to claim 16, wherein the electric power range in the electric power allocation is adjusted based on a required electric power from each of the power consumption devices.

19. The power control system according to claim 16, wherein the overall controller allocates the electric power range while giving a priority to each of the device controllers to achieve appropriately the electric power allocation according to a purpose of the electric power restriction.

20. The power control system according to claim 16, wherein when the electric power restriction is started, the electric power restriction controls to accord a change in the consumed electric power of the corresponding power consumption device with a change in the electric power allocation while simultaneously preventing the consumed electric power of the corresponding power consumption device from falling to zero.

21. The power control system according to claim 16, wherein:

when the electric power restriction is performed, a whole of a system including the corresponding power consumption device is changed in operation state from a usual operation state to a restricted operation state; and the restriction release is performed after the restricted operation state is released.

22. The power control system according to claim 21, wherein after the restricted operation state is released and the whole of the system including the corresponding power consumption device is stabilized, the restriction release is performed.

* * * * *